(12) United States Patent
Fu et al.

(10) Patent No.: US 11,494,663 B2
(45) Date of Patent: Nov. 8, 2022

(54) SYSTEMS AND METHODS FOR INTELLIGENT INFORMATION MANAGEMENT

(71) Applicant: BEIJING DIDI INFINITY TECHNOLOGY AND DEVELOPMENT CO., LTD., Beijing (CN)

(72) Inventors: Junhua Fu, Beijing (CN); Song Xue, Beijing (CN); Jiannan Lv, Beijing (CN); Jie Luo, Beijing (CN); Di Mei, Beijing (CN); Siyuan Sun, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 1232 days.

(21) Appl. No.: 15/964,047

(22) Filed: Apr. 26, 2018

(65) Prior Publication Data
US 2018/0247205 A1 Aug. 30, 2018

Related U.S. Application Data

(63) Continuation of application No. PCT/CN2016/113889, filed on Dec. 30, 2016.

(51) Int. Cl.
*G06N 5/02* (2006.01)
*G06Q 10/06* (2012.01)
(Continued)

(52) U.S. Cl.
CPC .............. *G06N 5/02* (2013.01); *G06F 16/951* (2019.01); *G06F 40/174* (2020.01); *G06F 40/186* (2020.01); *G06Q 10/067* (2013.01)

(58) Field of Classification Search
CPC ....... G06N 5/02; G06F 16/951; G06Q 10/067
See application file for complete search history.

(56) References Cited

U.S. PATENT DOCUMENTS 6,067,531 A 5/2000 Hoyt et al.
7,305,616 B1 12/2007 Nelson et al.
(Continued)

FOREIGN PATENT DOCUMENTS

CN 104933020 A 9/2015
CN 105740217 A 7/2016
(Continued)

OTHER PUBLICATIONS

The Extended European Search Report in European Application No. 16910791.9 dated May 23, 2019, 7 pages.
(Continued)

*Primary Examiner* — Kevin W Figueroa
(74) *Attorney, Agent, or Firm* — Metis IP LLC

(57) ABSTRACT

The present disclosure relates to systems and methods for generating a document based on a template document. The system may perform the methods to crawl across a multi-level tree along a path from a root to a plurality of leaf nodes. The multi-level tree may include a plurality of intermediate level nodes, wherein each of the plurality of intermediate level nodes may be associated with one or more sub-nodes at a next level. Each of the plurality of intermediate level nodes may include an intermediate subject of the intermediate level node, a semantically incomplete intermediate description related to the intermediate subject, and template data defining a position that the intermediate description may be in a corresponding template document.

20 Claims, 14 Drawing Sheets

(51) Int. Cl.
  *G06F 16/951* (2019.01)
  *G06F 40/174* (2020.01)
  *G06F 40/186* (2020.01)

(56) References Cited

U.S. PATENT DOCUMENTS

| | | | |
|---|---|---|---|
| 9,003,276 B2* | 4/2015 | Harrop | G06F 40/103 |
| | | | 715/234 |
| 9,026,903 B1 | 5/2015 | Michael et al. | |
| 9,424,333 B1* | 8/2016 | Bisignani | G06F 3/0482 |
| 2004/0122699 A1 | 6/2004 | Brito et al. | |
| 2004/0176954 A1 | 9/2004 | Wang | |
| 2006/0036612 A1 | 2/2006 | Harrop et al. | |
| 2007/0022003 A1* | 1/2007 | Chao | G06Q 30/0269 |
| | | | 705/14.69 |
| 2008/0022107 A1 | 1/2008 | Pickles et al. | |
| 2009/0049148 A1 | 2/2009 | McLennan | |
| 2011/0314364 A1 | 12/2011 | Hargarten et al. | |
| 2012/0150736 A1 | 6/2012 | Dickerson et al. | |
| 2013/0188788 A1 | 7/2013 | Pearson et al. | |
| 2013/0254739 A1* | 9/2013 | Chen | G06Q 10/067 |
| | | | 717/102 |

FOREIGN PATENT DOCUMENTS

| | | |
|---|---|---|
| EP | 1533728 A1 | 5/2005 |
| EP | 1865420 A2 | 12/2007 |
| WO | 03075191 A1 | 9/2003 |

OTHER PUBLICATIONS

International Search Report in PCT/CN2016/113889 dated Sep. 27, 2017, 5 pages.
Written opinion of the International Searching Authority in PCT/CN2016/113889 dated Sep. 27, 2017, 4 pages.
Examination Report in Australian Application No. 2016423486 dated Dec. 21, 2018, 9 pages.
The Second examination report in Australian Application No. 2016423486 dated Aug. 2, 2019, 5 pages.

* cited by examiner

Intelligent Management System

User Interface
500

Username/Job No.

Email (optional)

Department

Role

○ Operator
○ Visitor
○ Administrator

Password

Log in

Document Subject

○ Budget
○ Contract
○ Project
○ ...

Management Level

○ Low
○ Medium
○ High

Next

FIG. 5

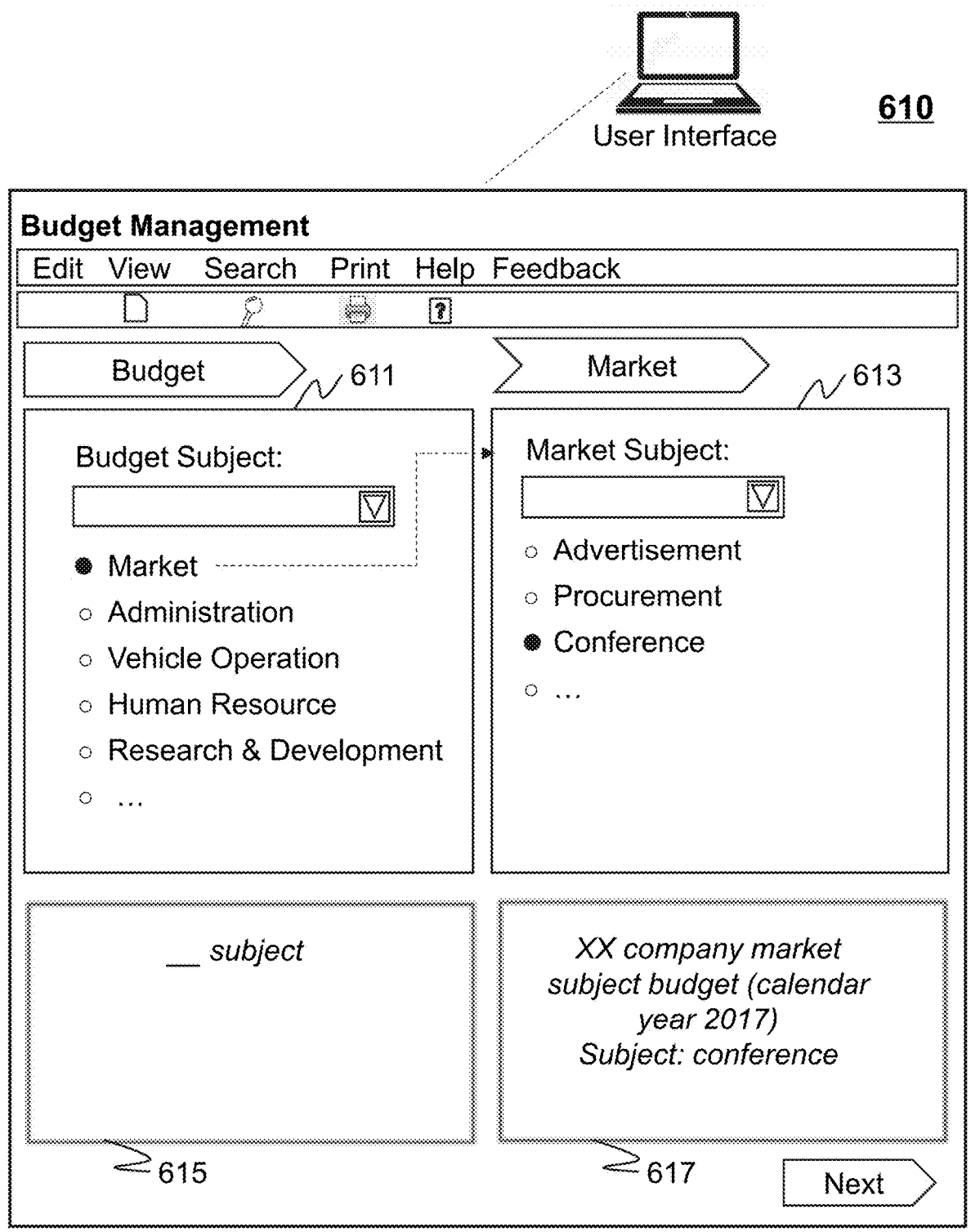
FIG. 6-A

620 User Interface

Budget Management

Edit  View  Search  Print  Help  Feedback

> Conference  621

Options  623

Conference Level  [▽]

Duration Period  [▽]

Number of Participants  [▽]

Hotel  625
- Room  [▽]
- Dinner  [▽]

Shuttle Service  627   ○ Yes  ○ No
- Vehicle  [▽]

Site Arrangement  629   ○ Yes  ○ No
- Banner  [▽]
- Translation  [▽]

...   Next >

Budget Document  [▽]

○ Text
○ Chart
○ Table
○ ...

Limitation

Proposed Budget $: [____]

Budget Model  [▷]

*XX company market subject budget (calendar year 2017)*
*Subject: conference*
*Conference level: __; Duration Period: __; Number of Participants: __*
*Hotel: __, ...*
*...*

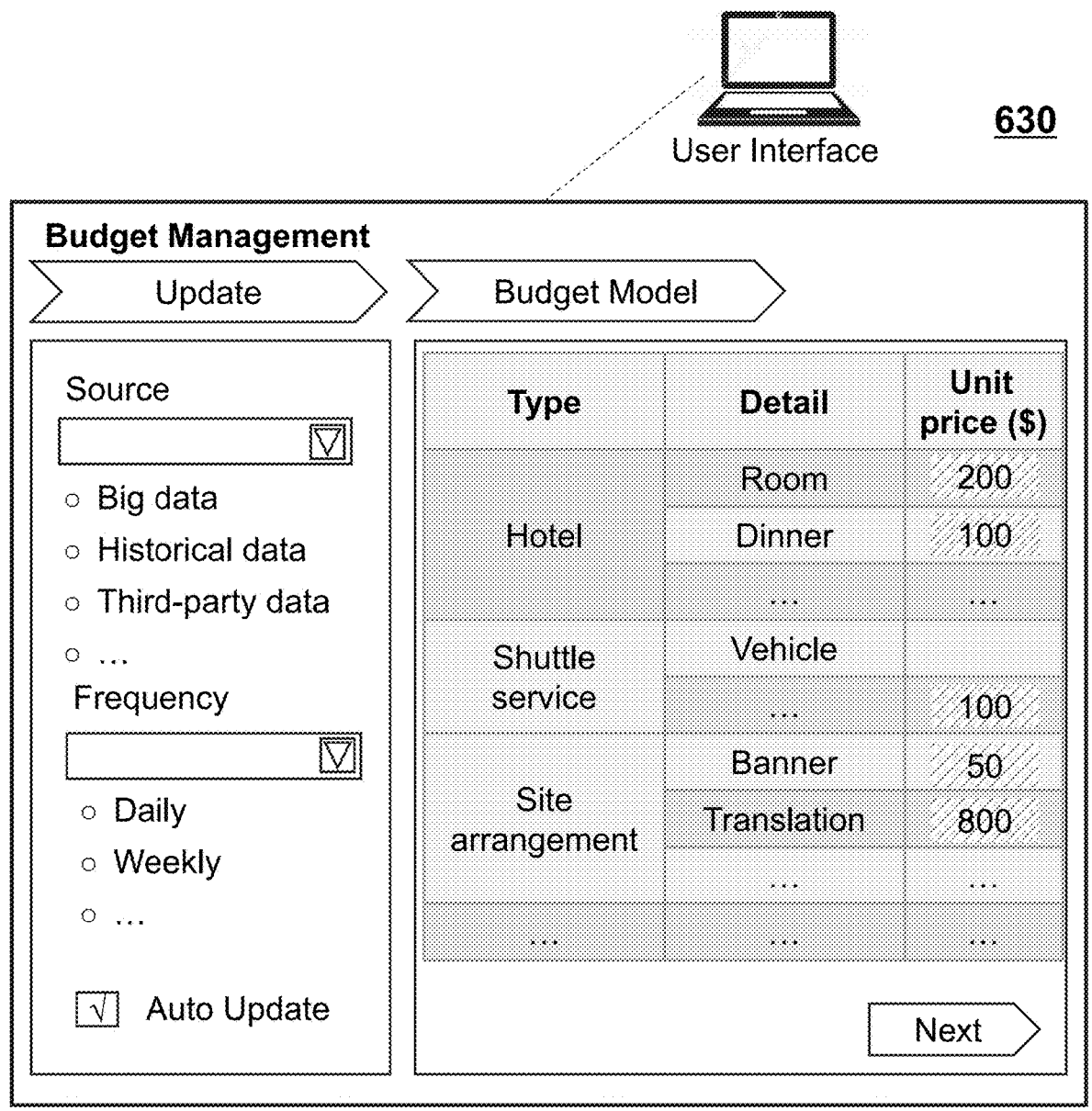
FIG. 6-C

FIG. 6-D

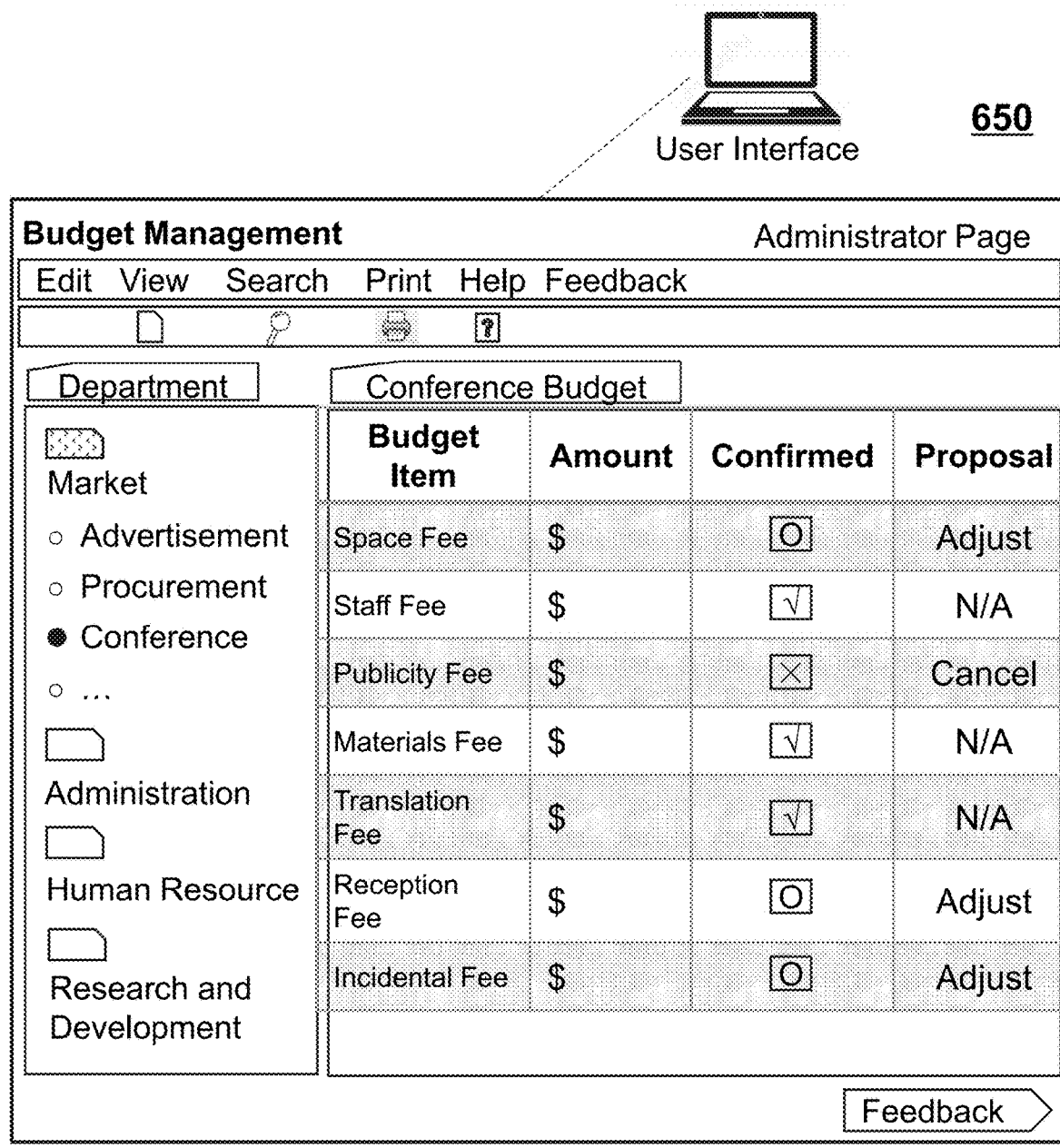
FIG. 6-E

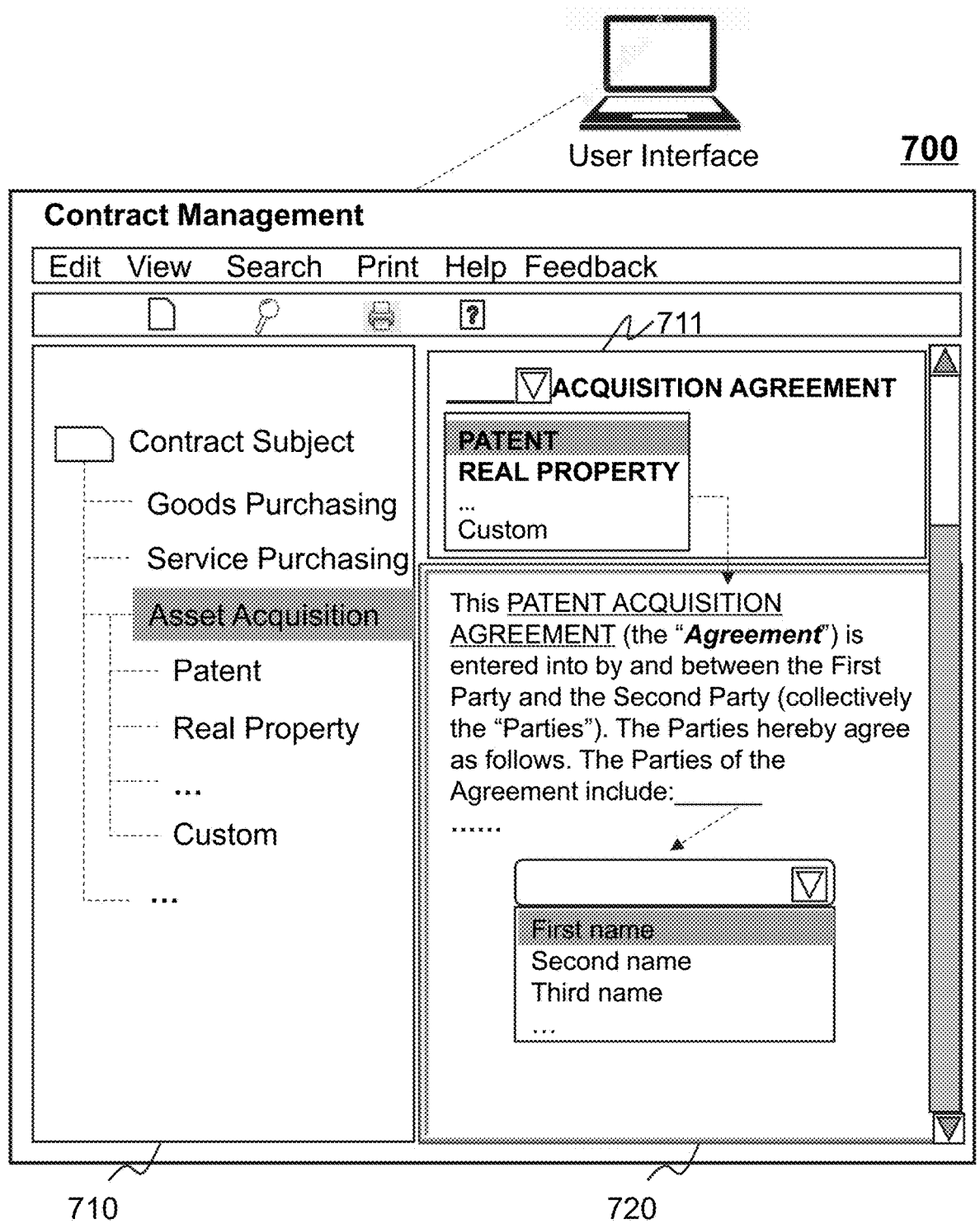
FIG. 7-A

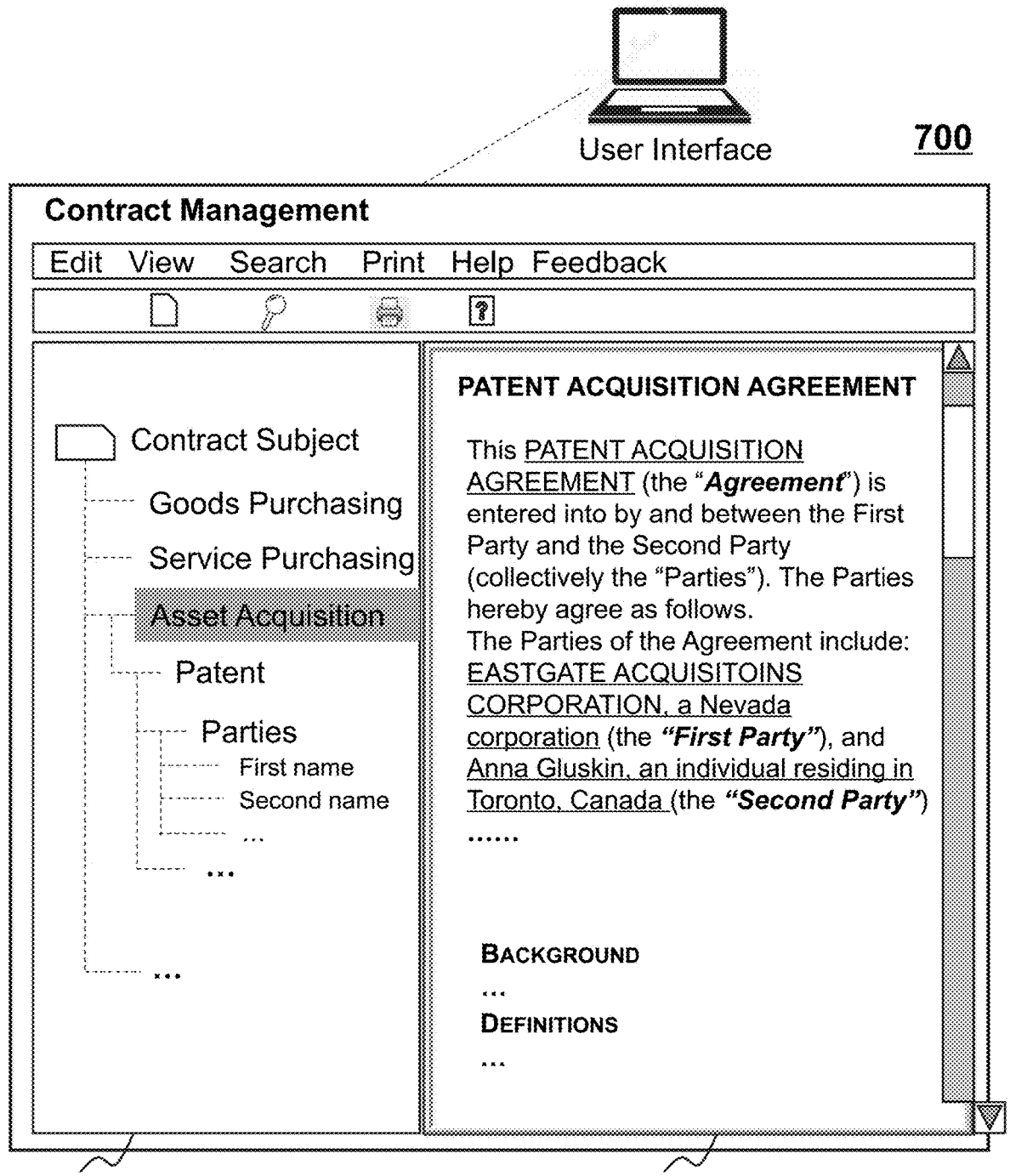
FIG. 7-B

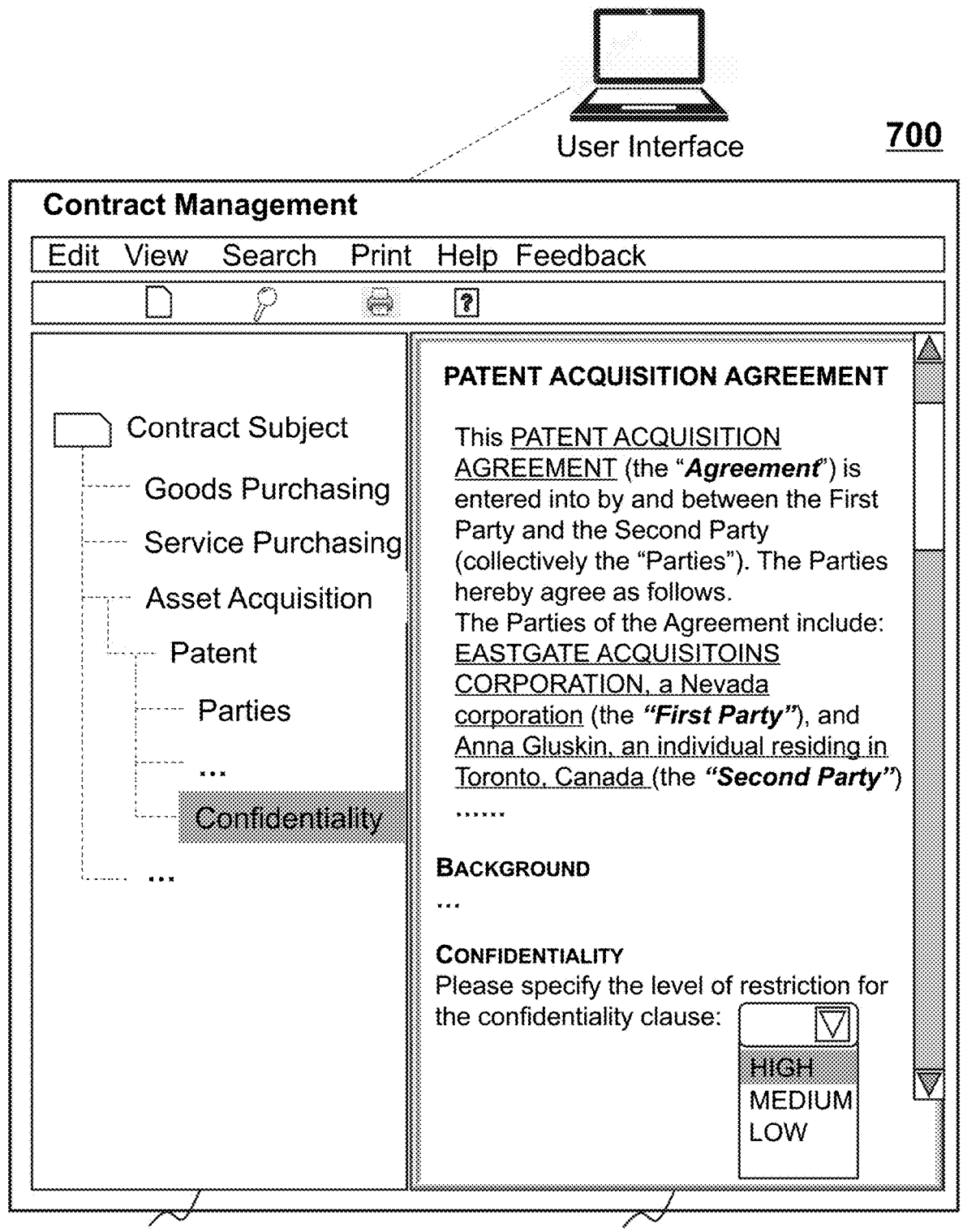
FIG. 7-C

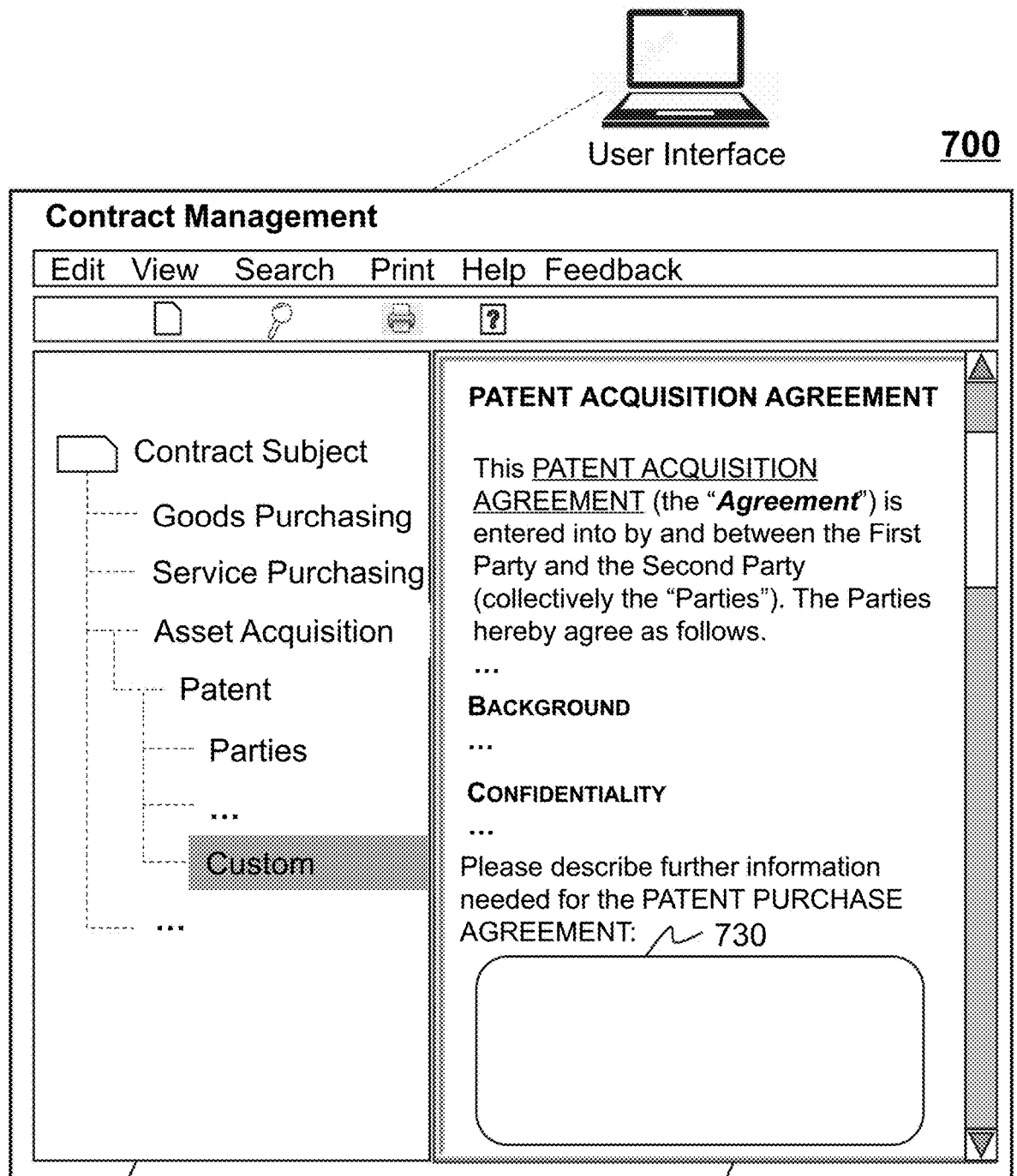
FIG. 7-D

SYSTEMS AND METHODS FOR INTELLIGENT INFORMATION MANAGEMENT

CROSS-REFERENCE TO RELATED APPLICATIONS

This application is a continuation of International Application No. PCT/CN2016/113889, filed on Dec. 30, 2016, which designates the United States of America, the content of which is incorporated herein in its entirety by reference.

TECHNICAL FIELD

The present disclosure generally relates to systems and methods for intelligent information management, and in particular, systems and methods for intelligently generating a document based on a template document.

BACKGROUND

With the development of information era, information management has become more and more important. A worker of a company may often make or process various kinds of documents (e.g., a budget document, a contract document, etc.). In some situations, it may be inefficient to manage the documents manually.

SUMMARY

According to an aspect of the present disclosure, a system is provided. The system may include at least one non-transitory storage medium. The non-transitory storage may include a plurality of nodes formed as a multi-level tree. The multi-level tree may include a plurality of intermediate level nodes, wherein each of the plurality of intermediate level nodes may be associated with one or more sub-nodes at a next level may include an intermediate subject of the intermediate level node. The intermediate level node may include a semantically incomplete intermediate description and template data. The intermediate description may relate to the intermediate subject and may include one or more blanks to be filled. Each blank may be associated with a sub-subject of a sub-node of the intermediate level node. The template data may define a position that the intermediate description may be in a corresponding template document.

In some embodiments, the sub-subject may semantically improve completeness of the intermediate description.

In some embodiments, the sub-subject may be determined based on historical data or big data analysis.

In some embodiments, the template data may further define a format of the intermediate description. In some embodiments, the format may include at least one of front size, front, color, underline, bold, italic, or shadow.

In some embodiments, the multi-level tree may further include a root. The root may be connected to the plurality of intermediate level nodes, wherein the subject of each of the plurality of intermediate level nodes is associated with the template document.

In some embodiments, the template document may include a budget template document or a contract template document.

In some embodiments, the multi-level tree may further include a plurality of leaf nodes, wherein each of the plurality of leaf nodes may be a sub-node of one of the plurality of intermediate level nodes. Each of the plurality of leaf nodes may include a leaf subject associated with a blank of the one or more blanks of the intermediate description of the intermediate level node and a leaf description related to the leaf subject to semantically complete the intermediate description of the intermediate level node.

In some embodiments, the leaf description may include at least one of a first version written in plain language and/or a second version written according to usage of trade of the template document.

In some embodiments, the at least one non-transitory storage medium may further include a set of instructions for generating a document according to the template document in the at least one non-transitory storage medium. The system may further include one or more processors configured to communicate with the at least one non-transitory storage medium. When the one or more processors execute the set of instructions, the one or more processors be directed to perform one or more of the following operations. The one or more processors may crawl across the multi-level tree along a path from the root to the plurality of leaf nodes. At each node of the multi-level tree, the one or more processors may display a description of the node to a user; at a blank of the description, the one or more processors may provide at least one subject associated with a sub-node of the node for the user to select; the one or more processors may identify a selected subject from the at least one subject; the one or more processors may move to and display a description of the sub-node corresponding to the selected subject. The one or more processors may determine that the crawling process has reached to one of the plurality of leaf nodes. The one or more processors may then generate the document.

In some embodiments, the one or more processors may display a first version written in plain language. The one or more processors may convert the description with a second version written according to usage of trade of the template document when determining that the crawling process reaches to one of the plurality of leaf nodes.

In some embodiments, the one or more processors may determine a threshold associated with the at least one subject, wherein the threshold may be updated based on historical data or big data analysis. The one or more processors may determine a parameter value of the document. The one or more processors may determine the parameter value may be larger than the threshold. The one or more processors may then provide a notification associated with the threshold.

According to another aspect of the present disclosure, a method may include one or more of the following operations. A computer server may access a plurality of nodes formed as a multi-level tree. The multi-level tree may include a plurality of intermediate level nodes, wherein each of the plurality of intermediate level nodes may be associated with one or more sub-nodes at a next level may include an intermediate subject of the intermediate level node. The intermediate level node may include a semantically incomplete intermediate description and template data. The intermediate description may relate to the intermediate subject and may include one or more blanks to be filled. Each blank may be associated with a sub-subject of a sub-node of the intermediate level node. The template data may define a position that the intermediate description may be in a corresponding template document.

In some embodiments, the sub-subject may semantically improve completeness of the intermediate description.

In some embodiments, the sub-subject may be determined based on historical data or big data analysis.

In some embodiments, the template data may further define a format of the intermediate description. In some embodiments, the format may include at least one of front size, front, color, underline, bold, italic, or shadow.

In some embodiments, the multi-level tree may further include a root. The root may be connected to the plurality of intermediate level nodes, wherein the subject of each of the plurality of intermediate level nodes is associated with the template document.

In some embodiments, the template document may include a budget template document or a contract template document.

In some embodiments, the multi-level tree may further include a plurality of leaf nodes, wherein each of the plurality of leaf nodes may be a sub-node of one of the plurality of intermediate level nodes. Each of the plurality of leaf nodes may include a leaf subject associated with a blank of the one or more blanks of the intermediate description of the intermediate level node and a leaf description related to the leaf subject to semantically complete the intermediate description of the intermediate level node.

In some embodiments, the leaf description may include at least one of a first version written in plain language and/or a second version written according to usage of trade of the template document.

In some embodiments, the computer server may crawl across the multi-level tree along a path from the root to the plurality of leaf nodes. At each node of the multi-level tree, the computer server may display a description of the node to a user; at a blank of the description, the computer server may provide at least one subject associated with a sub-node of the node for the user to select; the computer server may identify a selected subject from the at least one subject; the computer server may move to and display a description of the sub-node corresponding to the selected subject. The computer server may determine that the crawling process has reached to the plurality of leaf nodes. The computer server may then generate the document.

In some embodiments, the computer server may display a first version written in plain language. The computer server may convert the description with a second version written according to usage of trade of the template document when determining that the crawling process reaches to one of the plurality of leaf nodes.

In some embodiments, the computer server may determine a threshold associated with the at least one subject, wherein the threshold may be updated based on historical data or big data analysis. The computer server may determine a parameter value of the document. The computer server may determine the parameter value may be larger than the threshold. The one or more processors may then provide a notification associated with the threshold.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a schematic diagram illustrating an exemplary user interface for determining a document subject according to some embodiments of the present disclosure;

FIGS. 6-A through 6-E are schematic diagrams illustrating exemplary user interfaces for budget management according to some embodiments of the present disclosure; and FIGS. 7-A through 7-D are schematic diagrams illustrating exemplary user interfaces for contract management according to some embodiments of the present disclosure.

DETAILED DESCRIPTION

Figure 1:
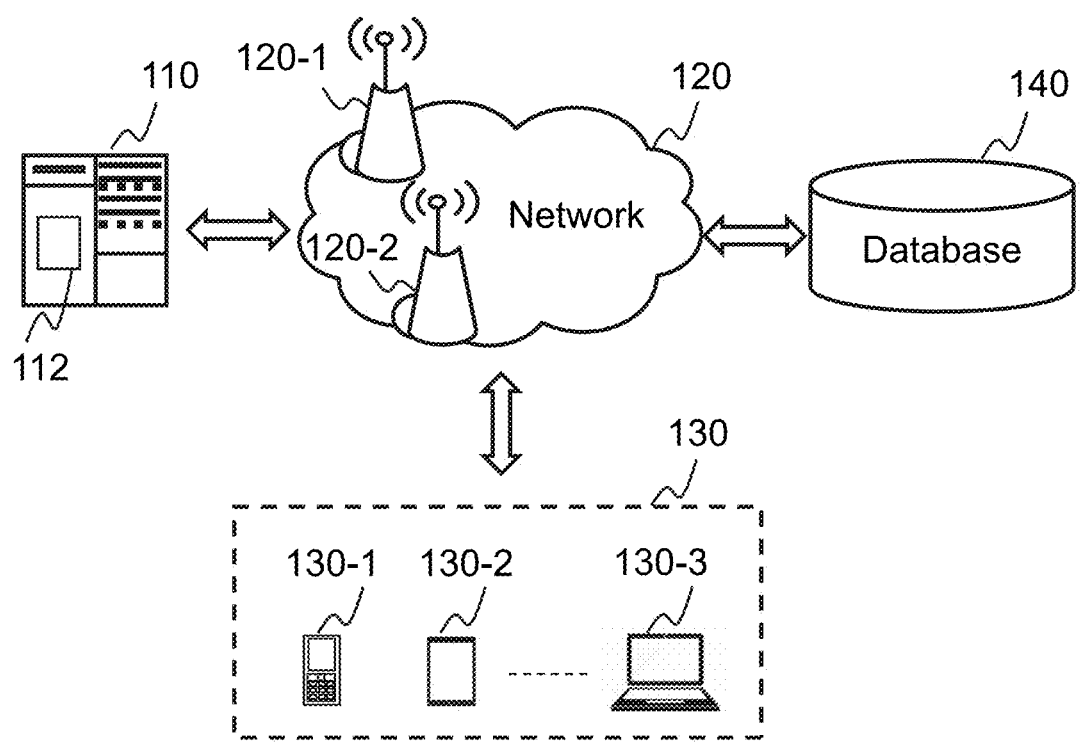
FIG. 1 is a schematic diagram illustrating an exemplary intelligent management system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts. Operations in one flowchart may be operated in any order under any combination, and all or part of operations in different flowchart may be combined for form a set of operations of an implementation.

Moreover, while the system and method in the present disclosure is described primarily in regard to generating a budget document or a contract document, it should also be understood that this is only one exemplary embodiment. The system or method of the present disclosure may be applied to any other kind of intelligent management. For example, the system or method of the present disclosure may be applied to different kinds of information or documents including annual report, year-end summary, corporate brochure, employee handbook, due diligence, or the like, or a combination thereof. The intelligent management system may also include any system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

An aspect of the present disclosure provides online systems and methods for generating a document (e.g., a budget document, a contract document, etc.) based on a template document. The systems and methods may allow a user to input various settings and/or selections to define contents of a document. The systems and methods may generate the corresponding contents in real time while the user is inputting the settings and/or making the selection to the content, and then simultaneously display the contents to the user. The systems and methods may also display the contents in plain language when the user is working on the documents, and then convert the plain language into professional terminologies (use of trade terminologies) and expressions to finalize the document.

Given the real time and simultaneous nature of generating and displaying the content of a document, one of ordinary skill in the art would understand that the technical solution provided in the present disclosure is computer specific. Moreover, the technical solution does not simply use a computer to automate what was previously done, but rather improves upon what was previously done with computers by solving a computer specific problem.

FIG. 1 is a block diagram of an exemplary intelligent management system 100 according to some embodiments of the present disclosure. For example, the intelligent management system 100 may generate a document (e.g., a budget document, a contract document, a due diligence document, etc.) based on a template document stored in a database. The intelligent management system 100 may be an online platform including a server 110, a network 120, a user terminal 130, and a database 140. The server 110 may include a processing engine 112.

In some embodiments, the server 110 may be a single computer server, or a computer server group. The server group may be centralized, or distributed (e.g., the server 110 may be a distributed system). In some embodiments, the server 110 may be local or remote. For example, the server 110 may access information and/or data stored in the user terminal 130, and/or the database 140 via the network 120. As another example, the server 110 may be directly connected to the user terminal 130, and/or the database 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the intelligent management to perform one or more functions described in the present disclosure. For example, the processing engine 112 may determine a template document based on a subject obtained from the user terminal 130 and generate a document based on the template document. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine 112 may be integrated in the user terminal 130.

The network 120 may facilitate exchange of information and/or data. In some embodiments, one or more components in the intelligent management system 100 (e.g., the server 110, the user terminal 130, and the database 140) may send information and/or data to other component(s) in the intelligent management system 100 via the network 120. For example, the server 110 may obtain/acquire an instruction associated with a template document from the user terminal 130 via the network 120. In some embodiments, the network 120 may be any type of wired or wireless network, or a combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the intelligent management system 100 may be connected to the network 120 to exchange data and/or information.

In some embodiments, the user terminal 130 may include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the user terminal 130 may be a device with interactive interface for modifying contents of a document, such as, inputting a supplementary clause.

In some embodiments, a user may send an instruction to the intelligent management system 100 to modify or review a document via the user terminal 130. The user may be an operator, an administrator, or a visitor. For example, the operator may input data into the intelligent management system 100 via a user interface on the user terminal 130. As another example, the accessor may visit a document stored in the intelligent management system 100 via a user interface on the user terminal 130. As a further example, the administrator may review a draft document generated by the intelligent management system 100 via a user interface on the user terminal 130. In some embodiments, "user" and "user terminal" may be used interchangeably in the present disclosure.

The database 140 may store data and/or instructions. In some embodiments, the database 140 may store data obtained from the user terminal 130. In some embodiments, the database 140 may store data and/or instructions that the server 110 may execute or use to perform exemplary methods described in the present disclosure. For example, the database 140 may store a plurality of template documents based on which the server 110 may generate different documents of various types (e.g., a budget document, a contract document). In some embodiments, the database 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the database 140 may be a multi-level tree.

In some embodiments, the database 140 may be connected to the network 120 to communicate with one or more components in the intelligent management system 100 (e.g., the server 110, the user terminal 130, etc.). One or more components in the intelligent management system 100 may access the data or instructions stored in the database 140 via the network 120. In some embodiments, the database 140 may be directly connected to or communicate with one or more components in the intelligent management system 100 (e.g., the server 110, the user terminal 130, etc.). In some embodiments, the database 140 may be a part of the server 110. In some embodiments, the database 140 may be integrated in the user terminal 130.

In some embodiments, one or more components in the intelligent management system 100 (e.g., the server 110, the user terminal 130, etc.) may have a permission to access the database 140. In some embodiments, one or more components in the intelligent management system 100 may refresh and/or modify information relating to the template documents when one or more conditions are met. For example, the server 110 may refresh and/or modify one or more clauses in a contract template document when a law is changed.

Figure 2:
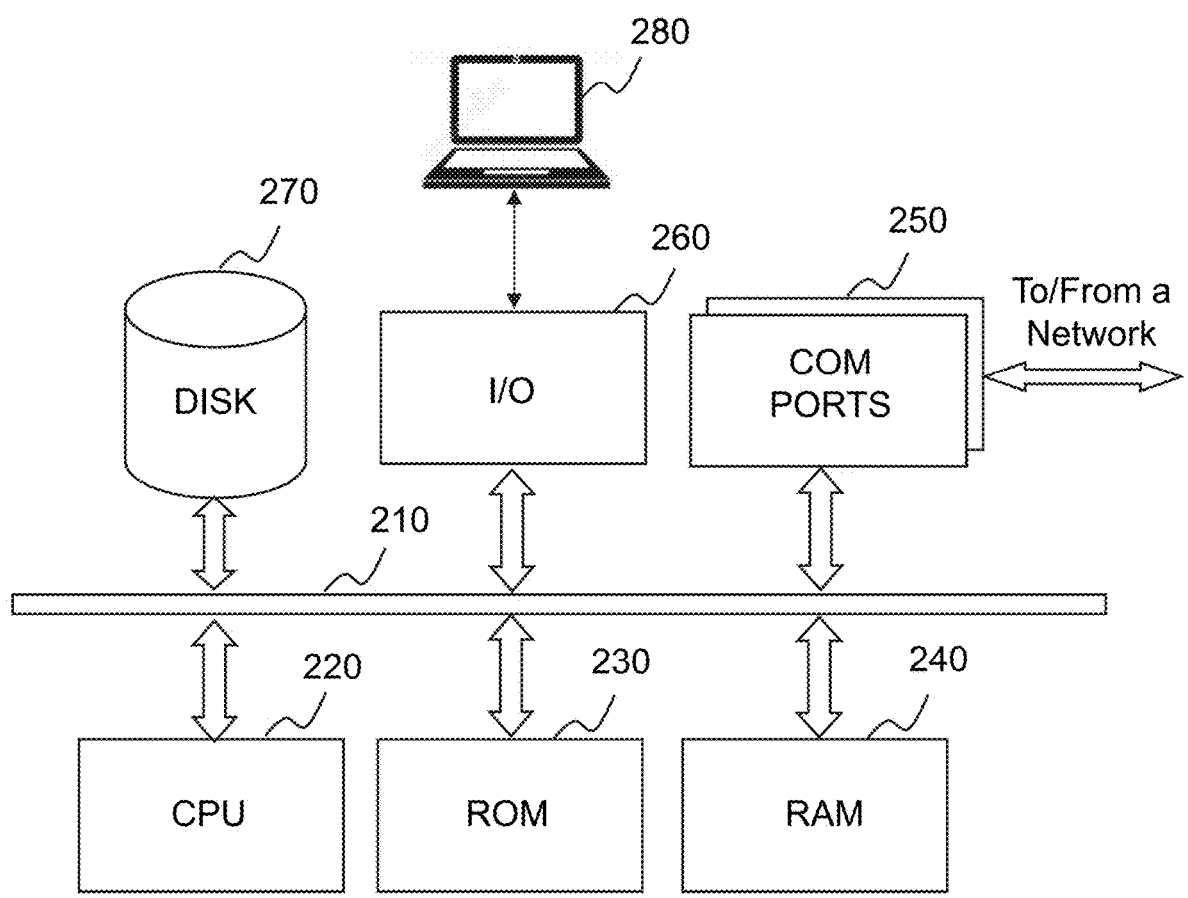
FIG. 2 is a schematic diagram illustrating an exemplary computing device in the intelligent management system according to some embodiments of the present disclosure.

FIG. 2 is a schematic diagram illustrating exemplary hardware and software components of a computing device 200 on which the computer server 110 or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an intelligent management system for the present disclosure. The computing device 200 may be used to implement any component of the intelligent management system 100 as described herein. For example, the processing engine 112 may be implemented on the computing device 200, via its hardware, software program, firmware, or a combination thereof. Although only one such computer is shown, for convenience, the computer functions relating to the intelligent management as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
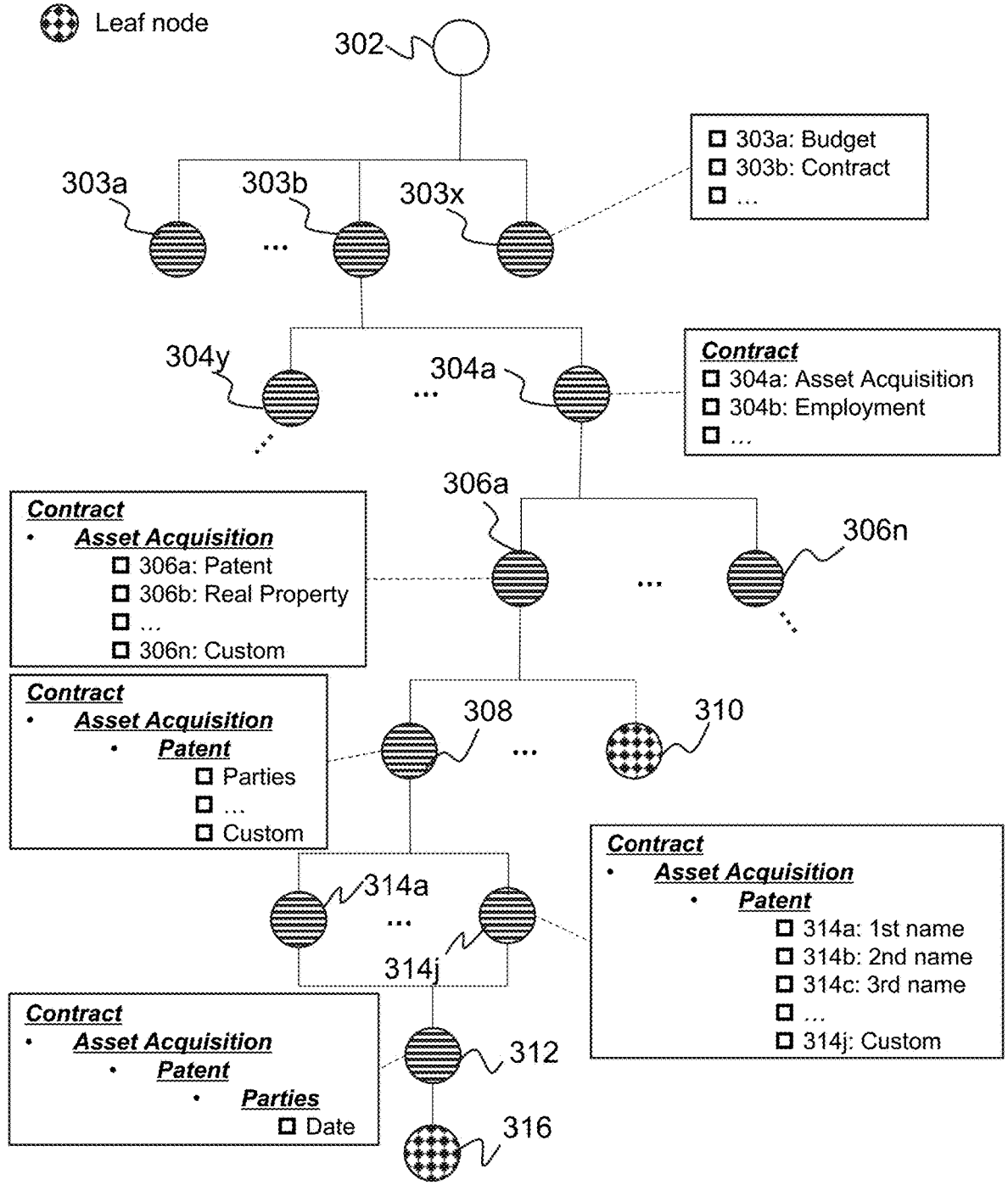
FIG. 3 is a schematic diagram illustrating an exemplary database of template documents organized as a multi-level tree according to some embodiments of the present disclosure.

FIG. 3 is a schematic diagram illustrating an exemplary database of template documents organized as a multi-level tree 300 according to some embodiments of the present disclosure. The tree 300 may be stored in the database 140 or a non-transitory storage medium of the processing engine 112. As illustrated in FIG. 3, the tree 300 may include a plurality of nodes. The plurality of nodes may include a root 302, a plurality of intermediate level nodes (e.g., intermediate level nodes 303a~334x, intermediate level nodes 304a~304y, etc.), and a plurality of leaf nodes (e.g., a leaf node 310, a leaf node 316, etc.).

The root 302 may be at a highest level (also referred to as a "first level") of the tree 300. The root 302 may be connected to a plurality of child nodes, i.e., intermediate level nodes. Each of the plurality of intermediate level nodes may further be connected to one or more sub-nodes at a next level. For a specific intermediate level node, the sub-node may be an intermediate level at a next level or a leaf node at a lowest level. For example, for the intermediate level node 306a, the sub-nodes may include the intermediate level node 308, the leaf node 310, etc.

Each node in the tree 300 below the root 302 may include a subject, a description of the subject, and template data of the description defining how the description may appear in a document. The description may be drafted in a single style. Alternatively, the description may be drafted in different styles and be used at different stages of document generation.

For example, in the tree 300, the root 302 may be connected with a plurality of child nodes (or sub-nodes) 303a~303x. Each child node of the root 302 may include a subject. For example, node 303a may include a subject "budget," and node 303b may include a subject "contract." For each subject, the corresponding node may include a description of the subject. For example, under the subject "contract," the node 303b may include a description such as:

This _____ (the "Agreement") is entered into by and between the First Party and the Second Party (collectively the "Parties"). The Parties hereby agree as follows.

(hereinafter "the contract description").

As another example, under the subject "budget", the node 303a may include a description such as:

XX company _____ budget (calendar year 2017)

For each node of the tree 300, the description may be drafted in a single style. Alternatively, the description may be drafted in different styles and be used at different stages of document generation. For example, the above contract description in node 303b may include 2 versions: a plain language version including descriptions drafted under plain language; and a professional version including descriptions drafted under professional terms (e.g., legalese). The plain language version may be displayed to a user when the user compiles the contract to make the contract easier to read. The plain language version may be converted to the professional version after the user completes the contract to make the contract language more accurate.

Each of the plurality of subjects may correspond to a template document, wherein the description may be part of the content in the template document. For example, the subject "contract" may correspond to a contract template document including the above contract description; and in node 303a the subject "budget" may correspond to a budget template document including a corresponding description about the subject "budget." In some embodiments, the database 140 may store a plurality of template documents. The plurality of template documents may be updated automatically based on historical statistics, machine learning, or big data statistics (also referred to as "big data analysis"). For example, for a contract template document, if legal regulations and/or case law have been changed, legal clause in the contract template documents may be updated accordingly.

The intermediate nodes may also include template data of the corresponding description, defining formats and positions of the description that appears in the corresponding template document.

As described above, the descriptions in the intermediate nodes may be incomplete and may include one or more blanks to be filled by the user. Filling the one or more blanks may semantically improve completeness of the description. Further, each blank in the description may be associated with a subject of one or more intermediate level nodes. For example, in the contract description of node 303b, providing whether the "Agreement" is an agreement about asset acquisition or employment may semantically improve the completeness of the above contract description. Accordingly, the blank in the description may further be associated with and/or connected to one or more intermediate level nodes. For example, in the contract description, the blank that defines the "Agreement" may associate the intermediate level node 303b with a few lower level intermediate level nodes 304a~304y, wherein node 304a includes a subject "asset acquisition" under the blank defining the "Agreement" and the node 304b includes a subject "employment" under the blank defining the "Agreement" in the contract description.

Similarly, each of the plurality of intermediate level nodes 304a~304y may include an intermediate description corresponding to its subject. For example, the node 304a may include a description about asset acquisition, which, if integrated into the contract description, may further improve the completeness of the contract description. The descriptions of asset acquisition may be incomplete and may include one or more blanks to be filled by the user. Filling the one or more blanks may semantically improve completeness of the asset acquisition description. Further, each blank in the asset acquisition description may be associated with a subject of one or more lower level intermediate level nodes. For example, providing whether the asset in the "asset acquisition" is about patent or real property may semantically improve the completeness of the asset acquisition description. Accordingly, the blank in the asset acquisition description may further be associated with and/or connected to one or more intermediate level nodes. For example, the intermediate level node 304a may be connected with a few lower level intermediate level nodes 306a~306n, each of the lower level intermediate level nodes 306a~306n corresponds to a subject under the "asset acquisition" category. For example, node 306a includes a subject "patent" under the blank and the node 306b includes a subject "real property" under the blank in the asset acquisition description. Again, the description in the intermediate level nodes may be drafted in a single style. Alternatively, the description may be drafted in different styles and be used at different stage of document generation.

The intermediate level nodes 303a~303x, 304a~304y, 306a~306n may include the template data to define the format and positions that the intermediate description may appear in the contract template document. For example, for the intermediate level node 308, the subject may be parties in the contract document, and the intermediate description thereof may include "The Parties of the Agreement include: _____". The template data may define that the position of the intermediate description is at the beginning of the contract template document. The template data may further define a format of the intermediate description in the template document. The format of the intermediate description may include front size, front, color, underline, bold, italic, shadow, or the like, or a combination thereof. For example, the template data may define the intermediate description "The Parties of the Agreement include: _____" as underlined bold. Further, the intermediate description may be drafted in a single style or in different styles and be used at different stage of document generation.

A user may modify the template document via the user terminal 130, and the processing engine 112 may generate a document (e.g., a contract document) based on the template document according to instructions from the user.

Each of the plurality of leaf nodes may include a leaf subject and a leaf description associated with the leaf subject. The leaf subject may be associated with a blank of one or more blanks of an intermediate description of an intermediate level node at an upper level. The leaf description may be semantically completed, therefore includes no blank to be filled. For example, node 316 may be a leaf node connected with an intermediate level node 312 at its upper level. The intermediate description in node 312 may include a blank that requires an effective date for the contract, and the subject of the intermediate level node 312 may be the date. The leaf description of the node 316 may include:

As of the Effective Date, First Party shall send to Second Party, via Federal Express or other reliable overnight delivery service or by hand delivery, all documents, communications and files (electronic or otherwise) relating to the Assigned Patent Rights currently in possession or control of Seller and its agents, counsel and related parties that pertain to the ownership and maintenance of the Patents (collectively, the "Documents").

In some embodiments, the leaf description may include a first version written in plain language and/or a second version written according to usage of trade of the template document. For example, for a contract template document, the first version may be expressed by natural language, the second version may be expressed by professional language (e.g., law language).

For illustration purposes, Table 1 below illustrates exemplary subjects and descriptions of the plurality of nodes in the tree 300. Table 1 takes "contract" merely as an example, but does not intended to limit the scope of the present disclosure.

Table 1 a table illustrating exemplary subjects of the plurality of nodes in the tree

| Node | Type | Subject |
|---|---|---|
| 302 | Root | N/A |
| 303a~303x | Intermediate level node | Document subject |
| 304a~304y | Intermediate level node | Contract subject |
| 306a~306n | Intermediate level node | Asset acquisition subject |

-continued

| Node | Type | Subject |
|---|---|---|
| 308 | Intermediate level node | Parties |
| 310 | Leaf node | Supplementary terms |
| 314a~314j | Intermediate level node | 1st name~custom |
| 312 | Intermediate level node | Date |
| 316 | Leaf node | Supplementary terms |

It should be noted that "1st name", "2nd name", . . . , and "custom" corresponding to intermediate nodes 314a~314j may be referred to as "seller", "purchaser", . . . in a contract associated with sales, and in some other contracts associated with different subjects, the names may be different accordingly.

Figure 4:
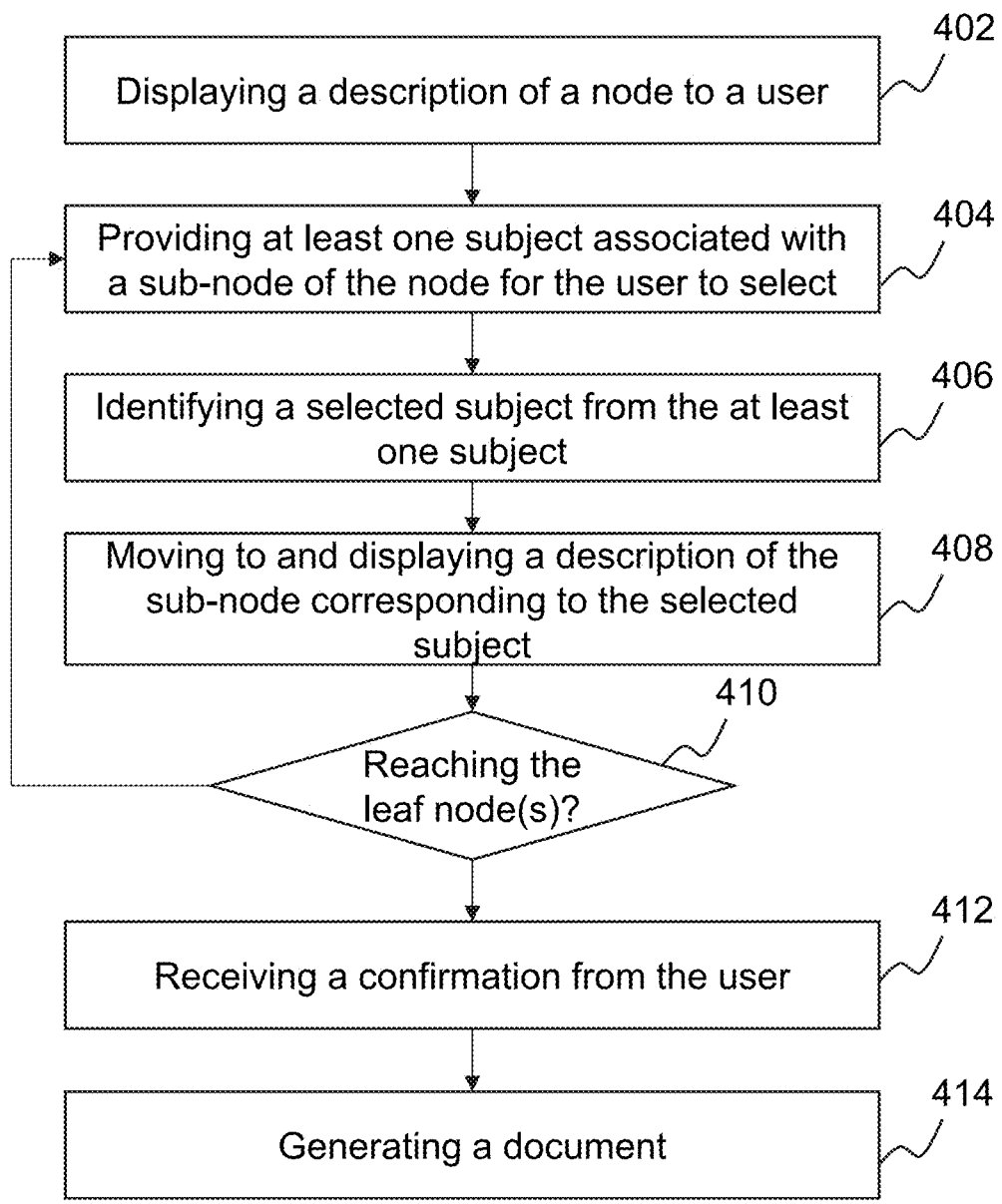
FIG. 4 is a flowchart illustrating an exemplary process/method for generating a document according to some embodiments of the present disclosure.

FIG. 4 is a flowchart illustrating an exemplary process/method 400 for generating a document by crawling across the tree 300 along a path from the root 302 to a leaf node according to some embodiments of the present disclosure. The process and/or method 400 may be executed by the system 100. For example, the process and/or method 400 may be implemented as a set of instructions (e.g., an application) stored in the storage ROM 230 or RAM 240. The CPU 210 may execute the set of instructions and may accordingly be directed to perform the process and/or method 400. The processing engine 112 may perform the process and/or method 400 at each node of the tree 300. For illustration purpose, however, the following description will take a specific node as an example.

The processing engine 112 may first access the root node 302, and then extract the subjects of its child nodes 303a-303x. The processing engine 112 may then provide the subjects of the child nodes (i.e., the highest level of the intermediate level nodes) to a user via the user terminal 130. For example, in the tree 300, the root 302 may have a plurality of child nodes (sub-nodes of the root 302) with subjects to "contract," "budget" etc. the processing engine 112 may extract the subjects of the child nodes to provide to the user terminal 130.

Upon receipt of a selection of the subjects from the user, in step 402, the processing engine 112 may access the intermediate level node of the tree 300 that corresponds with the selected subject, and display the description of the node (e.g., an intermediate description of an intermediate level node) to the user on the user terminal 130 or a screen associated with the system 100 (e.g., an external screen). For example, when the user selects the subject "contract" at the root 302, the processing engine 112 may access the corresponding intermediate level node 303b, extract and display the corresponding description included in the intermediate level node 303b to the user terminal 130. In the embodiments as shown in FIG. 3, for example, the description in the intermediate level node 303b may include:

This _____ (the 'Agreement') is entered into by and between the First Party and the Second Party (collectively the 'Parties'). The Parties hereby agree as follows.

As described above, the description of the node may be semantically incomplete and may include one or more blanks to be filled. Each of the one or more blanks may be associated with a subject of a sub-node (also referred to as a "sub-subject") of the node. For example, in the above description, the blank that defines the "Agreement" may be associated with a plurality of sub-nodes 304a-304n. Each of the plurality of sub-nodes may corresponds with a different subject. For example, node 304a may correspond with the subject "asset acquisition," and node 304*b* may correspond with the subject "employment." In some embodiments, the sub-subjects of the sub-nodes may be determined or updated based on historical data or big data analysis. In some embodiments, the intelligent management system 100 may update the sub-subjects automatically based on historical data or big data analysis according to a certain time interval (e.g., 1 week, 1 month).

The description of node 303*b* may be drafted in 2 versions: a plain language version and a professional version. The processing engine 112 may send the plain language version to the user terminal 130, so as to make the contract easier to read. The plain language version may later be converted to the professional version after the user completes the contract to make the contract language more accurate.

In step 404, at any blank of the description of the node, the processing engine 112 may provide at least one subject that is associated with a sub-node of the node for the user to select. For example, for the intermediate level node 303*b*, at the blank of the intermediate description "This _____ (the 'Agreement') . . . ", the processing engine 112 may provide the plurality of subjects associated with the blank for the user to select, for example, "asset acquisition", "employment", etc.

In step 406, the processing engine 112 may identify a selected subject from the at least one subject.

In this step, the user may select one subject from the at least one subject via the user terminal 130. Correspondingly, the processing engine 112 may receive the user's selection from the plurality of subjects.

In step 408, the processing engine 112 may move to and display the description of the sub-node corresponding to the selected subject. For example, for the intermediate level node 303*b*, if the user selects "asset acquisition", the processing engine 112 may move to and display the description of the sub-node 304*a* of the intermediate level node 303*b* corresponding to "asset acquisition". The description of the sub-node 304*a* may be drafted in 2 versions as well: a plain language version and a professional version. The processing engine 112 may send the plain language version to the user terminal 130, so as to make the contract easier to read. The plain language version may later be converted to the professional version after the user completes the contract to make the contract language more accurate.

In step 410, the processing engine 112 may determine whether the crawling process reaches one of the leaf node(s), if so, the processing engine 112 may send a notification to the user terminal 130 indicating that the process of creating a template document has ended.

In step 412, the processing engine 112 may receive a confirmation of the notification from the user to generate a document (e.g., a contract document).

In step 414, the processing engine 112 may convert the plain language version of the template document into the professional version, wherein the descriptions corresponding to each subject may be converted in to descriptions written in professional terminologies.

In step 410, if the crawling process doesn't reach the leaf node(s), the processing engine 112 may move back to step 404 to provide at least one subject associated with a next level sub-node of the sub-node for the user to select until the crawling process reaches to the leaf node(s). The processing engine 112 may reiterate the process between step 404 and 410 until the processing engine reaches a leaf node of the tree 300.

Further, after the processing engine 112 generates the document, the user may modify or edit the document via the user terminal 130. For example, the user may add a note (e.g., address needs to be verified) to notify other users who may review the document. As another example, for a budget document, the user may highlight a budget amount in the budget document.

It should be noted that the above description is taking only one cyclic process as an example, in actual situations, there may be a plurality of cyclic processed. Further, the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in step 404, the user may define a subject other than the at least one subject provided by the system 100. As another example, for each node of the plurality of nodes, the user may input custom contents at any blank of the description of the node.

FIG. 5 is a schematic diagram illustrating an exemplary user interface 500 via which a user may login the intelligent management system 100 according to some embodiments of the present disclosure. The user interface 500 may be displayed on the user terminal 130 when a user wishes to log in the intelligent management system 100.

On the user interface 500 for user log-in, the user may input a username or a job number, select a department, select a role (e.g., an operator, a visitor, or an administrator), and input a password. As used herein, different roles may have different permissions to access the intelligent management system 100. For example, the operator may have permissions to generate a document or partially modify the generated document. The visitor may only be permitted to read a document but do not have authority to modify the document. The administrator may have permissions to review and/or edit all contents of a document. Under some situations, when a user forgot the username, the user may log in the intelligent management system 100 through an email account. After the user logs in the intelligent management system 100, the processing engine 112 may provide general information and/or contact information (not shown in FIG. 5) relating to the user on the user interface 500. The general information may include a first name, a last name, a country, a city, a date of birth, a gender (e.g., a male, a female), or the like, or a combination thereof. The contact information may include phone number, email address, telephone number, an instant messaging system account number (e.g., QQ number, WeChat number, internal communication number), or the like, or a combination thereof.

After the user logs in the intelligent management system 100, the processing engine 112 may access the database 140 and provide a plurality of subjects on the user interface 500. The plurality of subjects may indicate a document subject, for example, budget, contract, project, etc. The user may determine a document subject based on the plurality of subjects or manually input a specific document subject in an input box. Each of the plurality of subjects may correspond to a template document stored in the database 140. For example, a subject "budget" may correspond to a budget template document. If the user selects "budget" as the document subject, the processing engine 112 may generate a budget document based on the budget template document.

In some embodiments, the processing engine 112 may also provide an option relating to a management level of the document to be generated. The management level may include a low level, a medium level, or a high level. For example, when the document to be generated is related to confidential information, the management level may be set as a high level, whereas when the document is only related to public information, the management level may be set as a low level.

After the user determines the document subject and/or the management level, the user may click a "next" button to enter into a user interface (e.g., solid box 611 on a user interface 610) corresponding to a plurality of intermediated level nodes at a next level (e.g., a second-level) of the tree 300.

Figure 6:
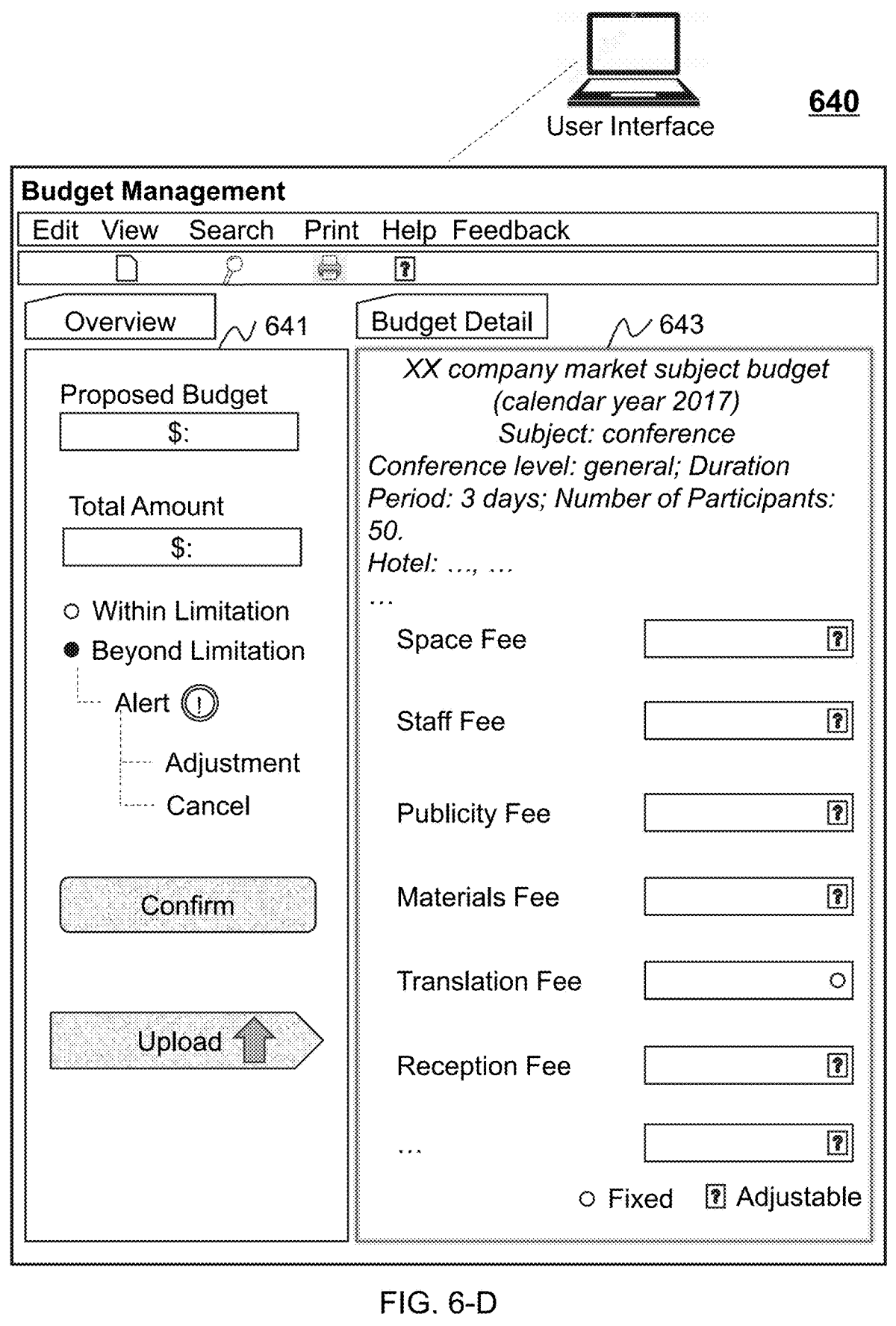

FIGS. 6-A through 6-E are schematic diagrams illustrating exemplary user interfaces for budget management according to some embodiments of the present disclosure.

Referring back to FIG. 5, if the user selects "budget" as the document subject when the processing engine 112 accesses the root 302 of the tree 300, the processing engine 112 may access the intermediate level node 303a in the database 140 to determine a budget template document, and then may provide and/or display a user interface 610 illustrated in FIG. 6-A on the user terminal 130 (i.e., the computer server 110 may instruct the user terminal 130 to display the user interface 610). When the processing engine accesses the intermediate level node 303a, the processing engine 112 may provide an intermediate description which may include a blank (not shown in FIG. 6-A):)

XX company _____ budget (calendar year 2017)

As shown in FIG. 6-A, in order to fill the blank above, the user terminal 130 may display both of a solid box 611 and a solid box 613 on the user interface 610. In some embodiments, the user terminal 130 may display the solid box 611 and the solid box 613 on different user interfaces. The solid box 611 may correspond to an intermediate level node at a second level (herein and hereafter referred to as a "second-level intermediate node") of the tree 300. The solid box 613 may correspond to a third-level intermediate node of the tree 300.

In the solid box 611, the user terminal 130 may display the incomplete intermediate description included in the corresponding intermediate level node. For example, in a solid box 615, the incomplete intermediate description may be: "_____ subject" which may include a blank. In some embodiments, the processing engine 112 may provide a plurality of budget subjects. The user may pull out and/or select one of the plurality of budget subjects via an icon "∇". The plurality of budget subjects may include market, administration, vehicle operation, human resource, research and development, or the like, or a combination thereof. The plurality of budget subjects may correspond to a plurality of intermediate subjects of a plurality of intermediate level nodes of the tree 300 at a next level. In some embodiments, the user may manually input a specific budget subject in a corresponding input box. In some embodiments, as the user selecting subjects of different level nodes in the tree 300, the processing engine 112 may simultaneously display the corresponding description (as well as descriptions of the selected nodes at higher levels).

Purely for illustration purpose, assume that the user selects "market" as the budget subject, processing engine 112 may render the user terminal 130 to display an intermediate description which may include a blank (not shown):

Subject: _____

The processing engine 112 may then provide a plurality of market subjects in the solid box 613. The plurality of market subjects may include advertisement, procurement, conference, or the like, or a combination thereof. The user may select one from the plurality of market subjects or manually input a market subject in a corresponding input box. The plurality of market subjects may correspond to a plurality of intermediate subjects of a plurality of intermediate level nodes of the tree 300 at a next level. Assuming that the user selects "conference" as the market subject, the processing engine 112 may complete the blank as illustrated in a solid box 617:

XX company market subject budget (calendar year 2017)
Subject: conference

Then the processing engine 112 may provide a plurality of incomplete intermediate descriptions associated with the conference as illustrated in FIG. 6-B.

After the users determines the market subject, the user may click a "next" button to determine details of a budget draft.

As illustrated in FIG. 6-B, after the user selects "conference" as the market subject, the processing engine 112 may provide a plurality of incomplete intermediate descriptions associated with the conference in a solid box 621. The solid box 621 may correspond to a plurality of intermediate level nodes at a next level of the tree 300. The plurality of intermediate descriptions may include one or more blanks (e.g., "conference level: _____" illustrated in a solid box 622) to be filled by the user. Each of the plurality of intermediate descriptions may include an intermediate subject and template data. The plurality of intermediate subjects may include conference level, duration period, number of participants, hotel, shuttle service, site arrangement, or the like, or a combination thereof. The template data may define a position of the intermediate description in the budget template document and/or a format of the intermediate description. For example, for the intermediate description "conference level: _____", the template data may define the position of the intermediate description at a beginning of the main body of the budget template document.

The user may fill the plurality of incomplete intermediate descriptions in any order (e.g., from top to bottom, from bottom to top). When the user fills a specific incomplete intermediate description of a specific intermediate level node, the processing engine 112 may provide a plurality of sub-subjects of a plurality of sub-nodes of the specific intermediate level node. For example, for the "conference level", the processing engine 112 may provide "international", "national", or "general" on the user interface 620. If the user selects "international", the intermediate description "conference level: _____" may be completed as "conference level: international". As another example, for the "hotel", the processing engine 112 may provide a list of hotels according to default settings of the intelligent management system 100, or an instruction from the user (e.g., "only five-star hotels"). After the user selects a specific hotel, the processing engine 112 may further provide a plurality of intermediate descriptions associated with "hotel" in a dashed box 625. The dashed box 625 may correspond to a plurality of intermediate level nodes associated with "hotel" at a next level (e.g., a fifth level) of the tree 300. Similarly, a dashed box 627 may correspond to a plurality of intermediate level nodes associated with "shuttle service" at a next level (e.g., a fifth level) of the tree 300, and a dashed box 629 may correspond to a plurality of intermediate level nodes associated with "site arrangement" at a next level (e.g., a fifth level) of the tree 300.

The processing engine 112 may further provide a plurality of sub-subjects of a plurality of sub-nodes until all the blanks in all the intermediate descriptions are filled. When the user fills all the blanks in the intermediate descriptions, that is, the processing engine 112 has reached the leaf nodes of the tree 300, the user may press a budget model button at a lower right corner on the user interface 620, and then the processing engine 112 may apply the complete intermediate descriptions and/or the leaf descriptions into a budget model (e.g., a budget model illustrated in FIG. 6-C) to determine a plurality of budget fees (e.g., a hotel fee, a translation fee). Each of the plurality of budget fees may correspond to an intermediate subject. For example, the processing engine 112 may define a unit price of a room in the hotel in the budget model, the processing engine 112 may determine the hotel fee by applying the number of rooms to the budget model. In some embodiments, during the filling process, the processing engine 112 may apply the complete intermediate descriptions to the budget model automatically, and when the filling process is finished, the processing engine 112 may determine the plurality of budget fees simultaneously or successively.

In some embodiments, the processing engine 112 may provide some options associated with the budget draft on the user interface 620 (e.g., in a solid box 623). In the solid box 623, the user may determine a format (e.g., a text, a table, a chart) of the budget draft. The processing engine 112 may also display a limitation relating to the budget document to be generated, for example, the processing engine 112 may provide a proposed budget threshold. The proposed budget threshold may be default settings of the intelligent management system 100 or may be adjustable. For example, for a budget document associated with "conference", the proposed budget threshold may be $80,000. In some embodiments, the processing engine 112 may define a threshold for each subject (e.g., an intermediate subject or a leaf subject). For example, for the "hotel", the processing engine 112 may define a threshold as $5,000. In some embodiments, the proposed budget threshold or the threshold for each subject may be updated based on historical data or big data analysis.

FIG. 6-C illustrates an exemplary budget model. In the budget model, the processing engine 112 may define a unit price for each subject ("subject" may correspond to an intermediate subject or a leaf subject of the tree 300, herein collectively referred to as "subject"). In some embodiments, the processing engine 112 may define a total price for an intermediate subject at a relatively high level (e.g., "hotel" at the fourth-level). In some embodiments, the processing engine 112 may define a detailed unit price for the leaf subjects (e.g., a "standard room" (not shown in FIG. 6-C) which may be at a leaf node). For example, the processing engine 112 may define that a unit price of a dinner may be $100 per day per person. In some embodiments, the unit price for each subject in the budget model may be adjustable. For example, the user may modify a specific unit price according to a specific offer. In some embodiments, price of a particular item may include an upper and/or lower limit. For example, the system 100 and/or the tree 300 may define that a specific unit price cannot be higher than a predetermined number. In some embodiments, the processing engine 112 may further define an extra cost in the budget model which may be used to deal with unexpected conditions.

The processing engine 112 may determine a total amount of the budget draft based on the budget model. The processing engine 112 may also determine a plurality of intermediate results associated for the plurality of subjects. For example, the processing engine 112 may determine a hotel fee, a shuttle service fee, a site arrangement fee, or the like, or a combination thereof.

The processing engine 112 may determine and/or update the budget model based on historical data, big data, or third-party data. For example, the processing engine 112 may access a third-party data source (e.g., a quote of a shuttle service company) to determine a unit price of a vehicle. As another example, the processing engine 112 may analyze historical data (e.g., historical budget documents) to determine an average unit price or an average intermediate result for a specific subject (e.g., "hotel"). The processing engine 112 may update the budget model automatically according to a certain frequency (e.g., daily, weekly). In some embodiments, the processing engine 112 may update the budget model based on an instruction from the user.

As illustrated in FIG. 6-D, based on the user input, the processing engine 112 may determine and then display an overview and/or budget details of the budget draft on a user interface 640. For example, it may be seen the proposed budget threshold and the total amount of the budget draft in a solid box 641. If the total amount of the budget draft is larger than the proposed budget threshold, the processing engine 112 may provide an alert to notify the user to adjust or cancel one or more subjects of the budget draft. In a solid box 643, the processing engine 112 may display a plurality of budget fees of the budget draft. The budget fee may include a predetermined attribute. For example, some fees may be adjustable and some may be fixed. The user may select any of the plurality of adjustable budget fees and click a corresponding textbox to adjust the budget fee. For example, for general conference, the user may adjust and/or cancel a staff fee or a translation fee as he/she wishes, whereas for some other fees, such as translation fee for an international conference, may be fixed by definition and may not be adjustable. The attribute of certain fees may be mutually exclusive, so that one budget fee may not be appear in the same budget with another. For example, when the conference is hold for professional participants, a publicity fee may be cancelled. In some embodiments, if the total amount of the budget draft is larger than the proposed budget threshold or a fee of a specific subject is larger than a fee threshold of the subject, the processing engine 112 may modify one or more of the fees in the budget draft automatically based on historical data, big data, or third-party data. For example, if the historical data indicates that historical fees of a specific item are all lower than a certain value, the processing engine 112 may automatically modify a fee of the specific item in the budget draft as equal to or lower than the certain value.

In some embodiments, the user may click a "confirm" button to send an instruction that the budget draft is finalized. In some embodiments, the user may upload the finalized budget draft to the database 140 or any storage device disclosed elsewhere in the present disclosure via an "upload" button. In some embodiments, the processing engine 112 may display the finalized budget draft in a format of highlight, bold, or underline on a user interface (not shown in FIG. 6-D). The processing engine 112 may transmit the finalized budget draft to an administrator to be reviewed. When the administrator logs in the intelligent management system 100, the processing engine 112 may provide a notification to the administrator on the user terminal 130 to notify him/her that there is a budget draft needs to be reviewed.

As illustrated in FIG. 6-E, an administrator may review the finalized budget draft on a user interface 650 via the user terminal 130. For example, the administrator may accept or reject one or more budget fees. In some embodiments, the administrator may further give a proposal (e.g. "adjust", "cancel", etc.) for the one or more budget fees. For example, for an expert conference, the administrator may reject the publicity fee. As another example, when a sponsor provides a space for the conference, the administrator may give a proposal to adjust the space fee. In some embodiments, the administrator may click a feedback button to send the review opinions to the user who prepared the budget draft.

FIGS. 7-A through 7-D are schematic diagrams illustrating exemplary user interfaces for contract management according to some embodiments of the present disclosure.

Referring back to FIG. 5, if the user selects "contract" as the document subject when the processing engine 112 accesses the root 302 of the tree 300, the processing engine 112 may access the intermediate level node 303b in the database 140 to determine a contract template document, and then may provide and/or display a user interface 700 on the user terminal 130, illustrated in FIG. 7-A. When the processing engine accesses the intermediate level node 303b, the processing engine 112 may provide an intermediate description which may include a blank (not shown in FIG. 7-A):

This _____ (the 'Agreement') is entered into by and between the First Party and the Second Party (collectively the 'Parties'). The Parties hereby agree as follows.

As shown in FIG. 7-A, the user terminal 130 may display a solid box 710 and a solid box 711 on the user interface 700. In some embodiments, the user terminal 130 may display the solid box 710 and the solid box 711 on different user interfaces or in different boxes in the same user interface. The solid box 710 may correspond to a second-level intermediate node of the tree 300 (e.g., node 303b). The solid box 711 may correspond to a third-level intermediate node of the multi-level tree structure 300 (e.g., node 304a).

Purely for illustration, in order to fill the blank above, the solid box 710 may include an incomplete intermediate description (not shown in FIG. 7-A) which may include a blank. In some embodiments, the processing engine 112 may provide a plurality of contract subjects, for example, goods purchasing, service purchasing, asset acquisition, raw material purchasing, finished product purchasing, investment, etc. A user may select one contract subject from the plurality of contract subjects or define a specific contract subject by a manual input in a corresponding input box. The plurality of contract subjects may correspond to a plurality of intermediate subjects of a plurality of intermediate level nodes of the tree 300 at a next level (e.g., nodes 304a~304y).

Purely for illustration, assume that the user selects "asset acquisition", in response to the selection of the user, the processing engine 112 may access the intermediate node 304a, and may display an incomplete intermediate description "_____ ACQUISITION AGREEMENT" which may include a blank in the solid box 711. The user may click the blank of the intermediate description, and then the processing engine 112 may provide a plurality of asset acquisition subjects (e.g., patents, shares, etc.). The plurality of asset acquisition subjects may correspond to a plurality of intermediate subjects of a plurality of intermediate level nodes (e.g., nodes 306a-306n). The user may select one asset acquisition subject (e.g., patent) from the plurality of asset acquisition subjects or define a specific asset acquisition subject by a manual input in a corresponding input box.

As the user selecting subjects of different level nodes in the tree 300, the processing engine 112 may simultaneously display the corresponding description (as well as descriptions of the selected nodes at higher levels) in a solid box 720. Purely for illustration purpose, assume that that the user selects "patents" as the asset acquisition subject, in response to the selection of the user, the processing engine 112 may access node 306a and display the contract draft in a solid box 720. The contract draft may include the corresponding descriptions included in intermediate level node 308 and all parent nodes of the intermediate level node 308. Therefore, what is displayed in the solid box 720 may be a comprehensive and/or accumulative description all the nodes that the processing engine 112 has accessed between the root 302 and the node 308. The descriptions may be displayed under the format defined in the template data of the corresponding nodes. For example, the accumulative description may include a plurality of incomplete sections, such as "parties", "background", "definition", "confidentiality", etc. The plurality of incomplete sections may correspond to a plurality of intermediate descriptions of a plurality of intermediate level nodes (e.g., node 308, node 310) in the tree 300. The solid box 720 may correspond to a plurality of intermediate level nodes in the tree 300 at a next level (e.g., nodes 314a~314j). Each of the plurality of intermediate descriptions (i.e., the plurality of incomplete sections) may include an intermediate subject and template data. Here the plurality of subjects may include "parties", "background", "definition", "confidentiality", etc. The template data may define a position of the intermediate description in the contract template document and/or a format of the intermediate description.

In each of the plurality of incomplete sections, the user may edit or define details. The user may edit the plurality of incomplete sections in any order (e.g., from top to bottom, from bottom to top). To help the user to complete the blanks of the plurality of sections, the processing engine 112 may provide explanations (not shown) associated with the plurality of sections in plain language. The explanations in the template data may correspond to the subject associated with the blank. For example, if the user wishes to define a legal responsibility of a party, the processing engine 112 may provide an explanation to explain what the "legal responsibility" means and under which situation the party should bear which legal responsibility.

When the user edits a specific section (i.e., a specific intermediate description of a specific intermediate level node), the processing engine 112 may provide a plurality of sub-subjects of a plurality of sub-nodes of the specific intermediate level node. For example, for the "parties", the processing engine 112 may provide "first name", "second name", "third name" on the user interface 700. If the user selects "first name", the processing engine 112 may further provide a plurality of sub-subjects of a plurality of sub-nodes associated with "first name", the user may further edit the blank(s) in the intermediate description(s) until reaches the leaf node(s) of the tree 300. After the user defines the parties of the contract, the processing engine 112 may display a plurality of sub-subjects of the "parties". For example, the processing engine 112 may access intermediate level node 312 of the tree 300, and display an intermediate description for the "effective date" (not shown in FIG. 7-A). The processing engine 112 may provide "day", "month", or "year" on the user interface 700. Alternatively, the user may manually custom a specific date.

As illustrated in FIG. 7-B, when the user completes one or more sections of the plurality of sections, the processing engine 112 may update the contract draft. It may be seen that one or more blanks are filled. It should be noted that an underline here is just provided for illustration purposes, it may indicate that there may be a blank before and has been filled now. The format of the paragraph in the contract draft may be automatically defined. For example, some of the key words in the paragraph such as "Agreement", "First Party", "Second Party" are italic and bold.

In some embodiments, the processing engine 112 may further provide a plurality of sections associated with a plurality of standard clauses. The processing engine 112 may classify the plurality of standard clauses into different categories, for example, payment procedure, shipping procedure, warranty, indemnity, intellectual property, etc. Each of the plurality of standard clauses may correspond to a specific legal consequence and/or a responsibility of the legal consequence.

As illustrated in FIG. 7-C, for the "confidentiality" section, the processing engine 112 may provide a plurality of confidentiality levels (e.g., high, medium, low). For example, "high" refers to a highest confidentiality requirement which may indicate that the contract document to be generated and/or related materials are all restricted in a limited group of people to read or review.

As illustrated in FIG. 7-D, other than the selections provided by the intelligent management system 100, the user may further manually input supplementary clauses in an input box 730. For example, the user may add a supplementary specification associated with unexpected conditions. The user may input the supplementary clauses in plain language, the processing engine 112 may convert the plain language to legalese based on artificial intelligence, machine learning, or context analysis method.

After the user fills all the blanks in each intermediate description at each level, the processing engine 112 may generate a complete contract draft. The user may further edit or modify details of the contract draft and send an instruction to output a finalized contract document.

It should be noted that the above descriptions relating to generating a contract document are provided for illustration purposes, and not intended to limit the scope of the present disclosure. For persons having ordinary skills in the art, multiple variations and modifications may be made under the teachings of the present disclosure. For example, below is an implementation scenario of the embodiments disclosed in the present disclosure.

In some embodiments, the intelligent management system 100 may receive a request (from a user) to generate a contract document. The request may include, for example, an indication of the subject of the contract (i.e., raw material purchasing, finished product purchasing, service purchasing, asset acquisition, investment, etc.). The request may further include an indication of a value of the contract, which may be a value of the product/service purchased under the contract or the dollar amount estimated according to the contract value.

By analyzing the request, the intelligent management system 100 may present different options to the user for composing or editing the contract document. In some embodiments, the options may include different standard clauses tailored for the subject of the contract. For example, for a raw material purchasing contract, the intelligent management system 100 may present standard clauses including an amount of the material purchased by the buyer, payment procedures, shipping procedures, insurance, force majeure, etc. For a service purchasing contract, the intelligent management system 100 may present standard clauses including intellectual property ownership, warranty and/or indemnity, payment procedures, etc.

In some embodiments, the standard clauses in the intelligent management system 100 may be organized into different categories, such as payment procedure, shipping procedure, warranty, indemnity, intellectual property, confidentiality, etc., each of which may correspond to a type of legal consequence and a responsibility of the consequence. Each category may include different variations that assign differently, to the parties of the contract, the legal responsibility corresponding to the category. For example, the intellectual property (IP) category may include multiple variations of a standard IP clause. One variation may assign all IP ownership under the contract to a first party of the contract. Another variation may assign all IP ownership under the contract to a second party of the contract. Still another variation may assign the IP ownership under the contract equally to the first and second parties.

In some embodiments, the confidentiality category may include, for example, multiple variations of a standard confidentiality clause. One variation may define confidential information exchanged between the contract parties to include all information transmitted electronically, physically, visually, or orally. Another variation may define the confidentiality information to include the information transmitted electronically, physically, visually, or orally subject to a written confirmation by the transmitting party that the information is confidential. Still another variation may define the confidential information to include the information transmitted by the contracting parties as well as their affiliates. Still another variation may define the confidential information to include the information transmitted by only the contracting parties.

In some embodiments, the system may receive input from the user that indicates a selection of one of the variations of the standard clause under each category. The intelligent management system 100 may then insert the selected variation of the standard clause to the form contract. In some embodiments, the intelligent management system 100 may present through a user interface a prompt that the user to select one of the variation. For example, the intelligent management system 100 may present a prompt "Please specify the level of restriction for the confidentiality clause: High, Medium, or Low." If the user selects "High," the system may insert the most restricted confidentiality clause into the contract, which defines the confidential information to include all of the information transmitted by the contracting parties and their affiliates. If the user selected "Medium" or "Low," the system may insert a more relaxed confidentiality clause.

In some embodiments, the intelligent management system 100 may include an interface that allows the user to input information to complete or further define the standard clauses. For example, for a service contract, the intelligent management system 100 may prompt the user to input a length of the service to be provided, a type of service to be provided, or an amount of fee to be paid for the service. The intelligent management system 100 may then insert the received information into each variation of the appropriate category and present the variations to the user for selection.

In some embodiments, the intelligent management system 100 may use artificial intelligence, machine learning, or context analysis to assist the user to generate an appropriate form contract. For example, the intelligent management system 100 may first prompt the user to describe a project or purchasing that requires a contract, using natural language, such as English, Chinese, Spanish, etc. The intelligent management system 100 may analyze the description received from the user and generate an initial draft of the form contract. The intelligent management system 100 may then present the draft of the form contract to the user and prompt the user to review and further edit each section of the form contract. Further editing of the form contract may be done according to the embodiments describe above, by presenting different variations of the standard category corresponding to the section of the form contract. In some embodiments, the intelligent management system 100 may present narratives or explanations that help guiding the user to edit the form contract or select a variation of a standard clauses. For example, when the user selects a particular variation, the intelligent management system 100 may present or display an explanation that explains to the user how the selected variation would affect the legal liability or responsibility of the two parties.

The disclosed intelligent management system 100 may allow a legal team as well as a non-legal team of a company or business unit to quickly generate a form contract for a particular project or purchasing without the needs to request costly legal services. The intelligent management system 100 may provide a convenient, efficient, reliable, and cost effective means for generating and managing the contracts of a business.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system, comprising:
   at least one non-transitory storage medium including a plurality of nodes formed as a multi-level tree, wherein the multi-level tree includes:
   a root;
   a plurality of intermediate level nodes connected to the root, each of the plurality of intermediate level nodes associated with one or more sub-nodes at a next level and including:
   an intermediate subject of the intermediate level node;

a semantically incomplete intermediate description related to the intermediate subject, the intermediate description including one or more blanks to be filled, wherein each blank is associated with a sub-subject of a sub-node of the intermediate level node; and template data defining a position that the intermediate description is in a corresponding template document; and a plurality of leaf nodes, wherein each of the plurality of leaf nodes is a sub-node of one of the plurality of intermediate level nodes;

wherein the at least one non-transitory storage medium is electronically connected to a bus and further includes a set of instructions for generating a document according to the template document in the at least one non-transitory storage medium; and the system further includes logic circuits electronically connected to the at least one non-transitory storage medium via the bus, wherein during operation, the logic circuits load the set of instructions and:

crawl across the multi-level tree along a path from the root to the plurality of leaf nodes, wherein at each node of the multi-level tree:
  display a description of the node to a user;
  at a blank of the description, provide at least one subject associated with a sub-node of the node for the user to select;
  identify a selected subject from the at least one subject, and
  move to and display a description of the sub-node corresponding to the selected subject;
determine that the crawling process reaches to one of the plurality of leaf nodes; and
generate the document.

2. The system of claim 1, wherein the sub-subject semantically improves completeness of the intermediate description.

3. The system of claim 1, wherein the sub-subject is determined based on historical data or big data analysis.

4. The system of claim 1, wherein the template data further defines a format of the intermediate description, wherein the format includes at least one of font size, font, color, underline, bold, italic, or shadow.

5. The system of claim 1,
wherein the subject of each of the plurality of intermediate level nodes is associated with the template document.

6. The system of claim 5, wherein the template document includes a budget template document or a contract template document.

7. The system of claim 1,
wherein each of the plurality of leaf nodes includes:
  a leaf subject associated with a blank of the one or more blanks of the intermediate description of the intermediate level node; and
  a leaf description related to the leaf subject to semantically complete the intermediate description of the intermediate level node.

8. The system of claim 7, wherein the leaf description includes at least one of a first version written in plain language or a second version written according to usage of trade of the template document.

9. The system of claim 1, wherein to display the description of the node, the logic circuits further:
  display a first version written in plain language; and
  when determining that the crawling process reaches to one of the plurality of leaf nodes, the logic circuits further:
    convert the description with a second version written according to usage of trade of the template document.

10. The system of claim 9, wherein the logic circuits further:
  determine a threshold associated with the at least one subject, wherein the threshold is updated based on historical data or big data analysis;
  determine a parameter value of the document;
  determine the parameter value is larger than the threshold; and
  provide a notification associated with the threshold.

11. A method implemented on at least one electronic device having logic circuits, at least one storage medium, and a communication platform connected to a network, comprising:
  accessing, by the logic circuits, a plurality of nodes formed as a multi-level tree, wherein the multi-level tree includes:
    a root;
    a plurality of intermediate level nodes connected to the root, each of the plurality of intermediate level nodes associated with one or more sub-nodes at a next level including an intermediate subject of the intermediate level node and including:
      an intermediate subject of the intermediate level node;
      a semantically incomplete intermediate description related to the intermediate subject, the intermediate description including one or more blanks to be filled, wherein each blank is associated with a sub-subject of a sub-node of the intermediate level node; and
      template data defining a position that the intermediate description is in a corresponding template document; and
    a plurality of leaf nodes, wherein each of the plurality of leaf nodes is a sub-node of one of the plurality of intermediate level nodes;
  wherein the method further includes:
  crawling, by the logic circuits, across the multi-level tree along a path from the root to the plurality of leaf nodes, wherein at each node of the multi-level tree:
    displaying, by the logic circuits, a description of the node to a user;
    at a blank of the description, providing, by the logic circuits, at least one subject associated with a sub-node of the node for the user to select;
    identifying, by the logic circuits, a selected subject from the at least one subject; and
    moving to and displaying, by the logic circuits, a description of the sub-node corresponding to the selected subject;
  determining, by the logic circuits, that the crawling process reaches to one of the plurality of leaf nodes; and
  generating, by the logic circuits, a document.

12. The method of claim 11, wherein the sub-subject semantically improves completeness of the intermediate description.

13. The method of claim 11, wherein the sub-subject is determined based on historical data or big data analysis.

14. The method of claim 11, wherein the template data further defines a format of the description, wherein the format includes at least one of font size, font, color, underline, bold, italic, or shadow.

15. The method of claim 11,
wherein the subject of each of the plurality of intermediate level nodes is associated with the template document.

16. The method of claim 15, wherein the template document includes a budget template document or a contract template document.

17. The method of claim 15,
wherein each of the plurality of leaf nodes includes:
- a leaf subject associated with a blank of the one or more blanks of the intermediate description of the intermediate level node; and
- a leaf description related to the leaf subject to semantically complete the intermediate description of the intermediate level node.

18. The method of claim 17, wherein the leaf description includes at least one of a first version written in plain language or a second version written according to usage of trade of the template document.

19. The method of claim 11, wherein the displaying of the description of the node includes:
- displaying, by the logic circuits, a first version written in plain language; and
- converting, by the logic circuits, the description with a second version written according to usage of trade of the template document when determining that the crawling process reaches to one of the plurality of leaf nodes.

20. The method of claim 19, wherein the method further includes:
- determining, by the logic circuits, a threshold associated with the at least one subject, wherein the threshold is updated based on historical data or big data analysis;
- determining, by the logic circuits, a parameter value of the document;
- determining, by the logic circuits, the parameter value is larger than the threshold; and
- providing, by the logic circuits, a notification associated with the threshold.

* * * * *